United States Patent [19]

Markham et al.

[11] 4,377,845

[45] Mar. 22, 1983

[54] OPTIONAL MACHINE INHIBITION FOR FEATURE MALFUNCTION

[75] Inventors: Harvey R. Markham, Westminster, Colo.; Paul R. Spivey, Winchester, Ky.

[73] Assignee: International Business Machines Corporation, Armonk, N.Y.

[21] Appl. No.: 192,118

[22] Filed: Sep. 29, 1980

[51] Int. Cl.³ ............................................... G06F 11/00
[52] U.S. Cl. ....................................... 364/200; 371/16
[58] Field of Search ... 364/200 MS File, 900 MS File; 371/16, 21, 25

[56] References Cited

U.S. PATENT DOCUMENTS 3,982,111  9/1976  Lerner et al. .................... 371/21
4,153,937  5/1979  Poland ............................. 364/200
4,156,905  5/1979  Fassbender ...................... 364/900
4,191,996  3/1980  Chesley ............................ 371/16
4,321,667  3/1982  Robbins et al. .................. 364/200

*Primary Examiner*—Joseph F. Ruggiero
*Assistant Examiner*—Michael R. Fleming
*Attorney, Agent, or Firm*—Carl M. Wright

[57] ABSTRACT

Method for continuing the operation of a machine despite the malfunction of a nonessential feature. If the determination is made that a feature program is nonoperable, another check is made by sensing a corresponding flag to determine whether the feature is essential to the continued operation of the machine, and, if not, allows the machine to continue operation without the feature.

5 Claims, 8 Drawing Figures

OPTIONAL MACHINE INHIBITION FOR FEATURE MALFUNCTION

TECHNICAL FIELD

This invention relates to control memory systems, and particularly to the selective inhibition of control system add-on control modules for feature control.

When additional features are added to a machine such as an electrophotostatic copier which already includes a programmed microprocessor system for controlling its operation, the add-on memory modules with the control program for the feature being added must be interfaced with the main program. Before the feature is operated, the control code is verified. In the usual approach, a code error or some other malfunction that precludes proper operation causes the machine to be halted, and the services of maintenance personnel are required to correct the problem and to restore the machine to the proper running condition.

Some features, however, are not required for the operation of the rest of the machine. For example, a copier with a faulty collator can continue to make copies that are accumulated in the copy exit holder even though multiple copies cannot be collated. Therefore, it would be undesirable to halt a copier altogether just because a nonessential feature is malfunctioning.

Background Art

The use of microprocessor-based controllers is widespread and is becoming more popular. The reason for the increasing popularity of the microprocessor-based system as a controller is readily apparent from a consideration of its advantages, especially when compared to a hardware or unique device logic-based controller.

The latter requires a complicated design, even when aided by a computer, providing a separate state for each different control step. The complexity and difficulty of the design increase exponentially with respect to an increase in the number of states required. To design the most efficient controller is usually not even attempted because of the amount of effort required. The increase in controller efficiency is usually not sufficient to offset the additional design effort required. The final controller requires a large number of logic devices as well as complicated printed circuit boards for its implementation.

Once such a hardwired controller is completed, it normally requires a certain amount of debugging which can use more than half the design time of a large controller. If the design is to be altered or expanded to include an unforeseen requirement or to add new features to the machine being controlled, it is almost impossible to modify the design, requiring instead a completely new design and construction effort.

Clearly, the hardwired approach is expensive in terms of the hardware, time, and resources required to reach the final product.

By contrast, the microprocessor-based system is more easily designed. The design approach requires predominantly a programming effort although a certain amount of hardware design is necessary for the auxiliary gating and driving circuits that interface the components of the controlled system with the microprocessor.

The final system is simply altered by changing or deleting program coding or by using different subroutines. Similarly, the system is readily expanded by adding new coding or new subroutines.

The resulting system is usually small in terms of the number of devices required, being no more than a single microcomputer chip in some instances. The substitution of programming effort for sequential machine design and the small number of required additional devices result in an inexpensive system. It is for these very considerations that the microprocessor was developed.

There are, of course, some disadvantages to the use of microprocessor control systems. The control signal output and input signal processes are necessarily performed serially, although handled in a bit parallel manner. Usually, however, this ad-seriatim process is not too great a disadvantage because the microprocessor operates at a speed many magnitudes greater than that of the controlled machine. In fact, the microprocessor is used only for a small fraction of the total time during which the machine is operating. The stored program must be custom made if stored in a read-only memory but the cost of such devices is decreasing and the price of large capacity, electrically programmable memory devices has come within the reach of even the hobbyist.

The use of read-only memory devices to store programs present a problem when the program is to be modified by changes, deletions, or additions, especially when the program is large and complicated. The modification of a debugged program is fraught with peril and can result in complete inoperability of the entire program. Usually when the program is written, for example, as the control program for a machine such as an electrophotostatic copier, all the possible features cannot be foreseen and provided for. Large and complex programs are usually written in segments, sometimes called modules, which are catenated into a resulting main program. The main program may use many subroutines which can be stored in varying locations, the main program providing for calling and linking to these subroutines.

To provide a separate call and link for every new program would require a restrictively large number of call and link instructions as well as a plethora of return flag indicators, even if the number of features to be added were known at the time the main program is written. Therefore, the addition of more programming, especially where the memory is predominantly of the read-only type and the amount of writable memory is limited, is a unique problem. This is a problem that is addressed by a copending application, Ser. No. 089,799, assigned to the same assignee as the present application.

When the program for a feature has been added to the main program, it may be essential to the operation of the machine, such as a security feature, or it may not be necessary to the continued operation of the machine, such as a collator controller. Normally, when a program error is encountered, the machine is halted and an indication displayed to call maintenance personnel. Until the machine is repaired, it cannot be used at all.

The invention to be described and illustrated offers an alternative to this normal approach by providing a determination of the essentialness of the feature that malfunctions and allows the machine to continue operation without a nonessential feature.

DISCLOSURE OF THE INVENTION

In accordance with the present invention, an existing main program is augmented by adding code stored in a separate memory module which has provision for checking its validity by storing at a given location therein a special word that corresponds to a known reference word. When the module is addressed, the test word is compared to the reference word to verify that the memory is operable. If not operable, the present invention performs another test to determine whether the add-on program is essential to the continued operation of the main program. If not, the main program is continued and, if so, the main program is halted.

An advantage of the invention is the ability to continue the operation of a machine that is controlled by the main program even though a nonessential feature is not operable, the usual alternative being to halt the operation of the machine for any failure until the malfunction is corrected.

DESCRIPTION OF THE PREFERRED EMBODIMENT

Figure 1:
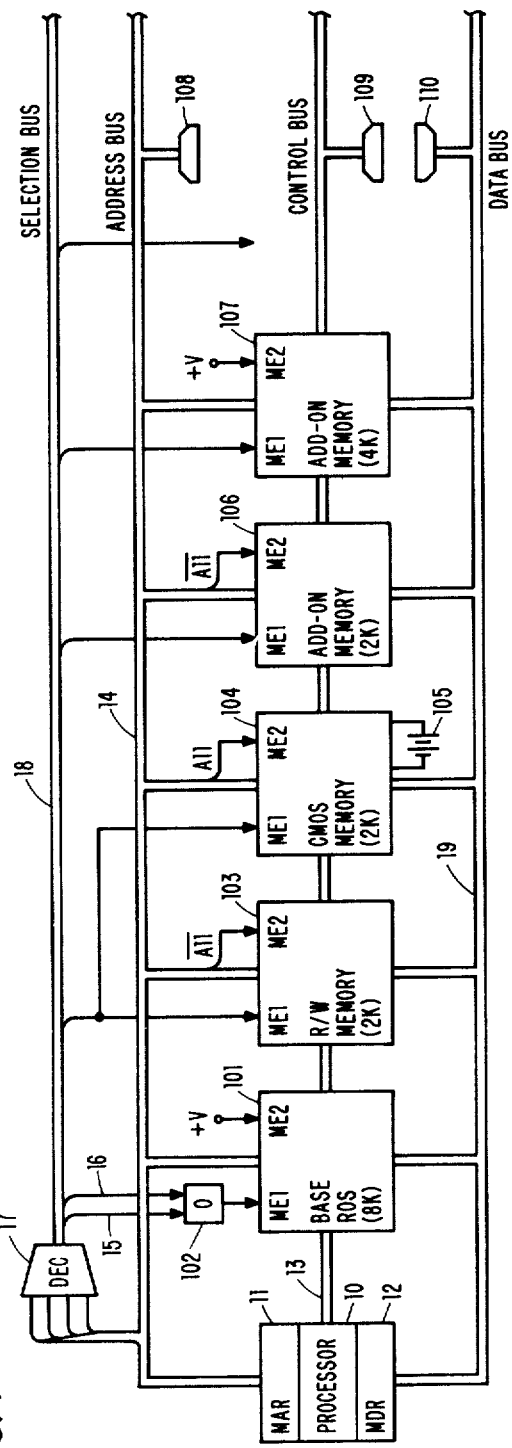
FIG. 1 is a block diagram of a system in which the invention would be useful.

In connection with FIG. 1, a system in which the invention can be used will be described. A processor 10 has a memory address register 11 and a memory data register 12. The memory address register furnishes a number of bits to an address bus 14, consisting typically of sixteen bits or lines, viz., $2'0$ to $2'15$. (See exponentiation in the Appendix.) In the system of FIG. 1, the four-most significant bits, $2'12$ to $2'15$, are coupled to a decoder 17 whose output is a selection bus 18 comprising sixteen lines. Only one of the lines on the selection bus can be active at a given time due to the action of the decoder 17, which is well known in the art.

The remaining twelve address bits are coupled to individual memory arrays in parallel.

A data bus 19, typically eight lines, is coupled to the memory data register 12 of the processor. The data bus 19 is coupled in parallel to each of the memory arrays for reading data or for supplying data to be written into the writable memories. A control bus 13 is also provided which transmits to each of the memory arrays signals such as Read/Write, timing, and the like. The control bus 13 is also coupled to each memory array in parallel.

The twelve least significant bits of the address bus are capable of selecting one out of 4,096 memory locations. (Hereinafter, the letter K will be used to represent 1,024 vice 1,000 so that 4,096 is written 4K.)

A base Read Only Storage 101 is shown as having 8K locations. Therefore, two select lines 15 and 16 are coupled to an OR gate 102 which furnishes a memory enable signal. Each memory array is shown as having two memory enable input terminals. In the system being described, both Memory Enable 1 (ME1) and 2 (ME2) must receive a high signal for the associated memory to be enabled. (Many commercially available memory arrays are constructed so that one enabling input must be high and the other enabling input must be low for the memory array to be enabled.) The second memory enable terminal, ME2, of memory array 101 is coupled to a high voltage since it is not required for selection of the memory. Each line of the selection bus 18 selects a particular 4K address group depending on the four-most significant digits of the sixteen-bit address. Therefore, to enable the 8K memory, one of two 4K selection lines is required.

A memory array 103 is shown as a Read/Write memory having 2K storage locations. Because only eleven lines are required to select one of the 2K memory locations, only the $2'0$ through $2'10$ address lines are coupled to the address inputs of the array 103. To select the memory array 103, its ME2 terminal is coupled to the $2'11$ ($\overline{A11}$) address inverted bus line. (It is assumed that both the true and the inverted signals are available from the address bus.)

A second 2K memory array 104, shown as a CMOS non-volatile memory (being powered by battery 105 in case of power loss), is coupled to the same line from the selection bus 18 as the memory array 103. The terminal ME2 of the memory array 104, however, is coupled to the $2'11$ (A11) address normal line instead of the inverted line. As a result, the 4K represented by both the memory array 103 and the memory array 104 are selected by a particular selection line from the selection bus 18 but the individual array is selected by the state of the $2'11$ (A11) bit of the address.

An Add-On memory array 106 having a capacity of 2K storage locations is shown as coupled to a fourth line from the selection bus 18 with its second memory enabling terminal coupled to the $2'11$ bit inverted. A second Add-On memory 107 having 4K locations is coupled to a different line from the selection bus 18 with its second enabling terminal coupled to an enabling positive voltage. Because it has a 4K capacity, only the output line from the selection bus 18 is required to select the memory array 107. In the event that a second 2K capacity memory array is added, the same selection line from the bus 18 coupled to the first enabling terminal of the array 106 can be used as the input to the ME1 terminal of the new array and the ME2 terminal would be coupled to the $2'11$ normal bit.

Provision is made for coupling additional memory arrays as shown by the plugs 108, 109 and 110 for coupling a new array to the address bus, control bus, and data bus, respectively. A selection line from the selection bus 18 is also provided. It is assumed that additional provisions are made for further Add-On memory arrays.

In the CMOS memory 104, memory space is usually limited so that adding new memory modules must use as little memory as possible. It is also desirable that the addition of new modules require as little extra programming in the main program as possible.

Figure 2:
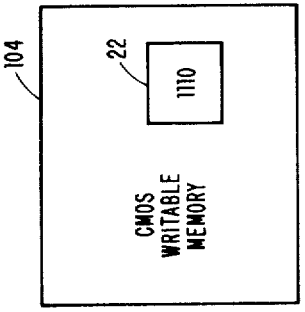
FIG. 2 is a mapping of a writable nonvolatile memory space.

FIG. 2 shows a partial map of the CMOS writable memory 104 including a memory table 22. This table is used to store a bit corresponding to each memory add-on module usable with the system. In the following description, it is assumed that a bit is stored for each 2K memory module. Alternatively, however, the table may contain the starting addresses of each add-on memory module, but this would require more than an additional magnitude of storage space. For example, an address comprising sixteen bits would require two bytes per add-on memory module whereas using a bit per module requires only one byte for eight modules.

In the table, if an added module is active or authorized, its corresponding bit is set and if the program in the corresponding add-on module is not authorized, the bit is reset. (If addresses were stored, a non-zero address would indicate an authorized add-on memory module.) An example of an add-on program is a program required for the control of a copier feature such as a collator in a processor-controlled copy machine. A feature is not authorized if the customer does not order the feature, e.g., decides a collator is not needed.

To save space in the CMOS writable memory 104, the addresses required to transfer to the add-on program are calculated as will be described in detail below.

Figure 3:
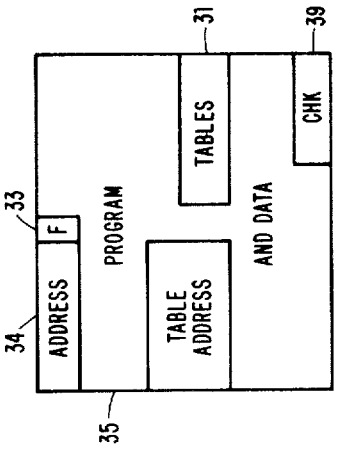
FIG. 3 is a mapping of a representative add-on read-only memory module space.

FIG. 3 is a memory map of an add-on module showing that the first location stores the first address of the module itself. In the general case, any reference value may be stored at any predetermined address within the program module. If the program module is to contain tables, the table address can be stored at a predetermined offset or displacement from the first address to permit access to the table by a user program. This will be described in more detail below.

One or more check characters are also stored to provide another level of verification of the memory module. A check character can be a cyclic redundancy check, a module-N residue counter, or a block parity character. These types of check characters are well known in the art. For example, if a residue counter is used for verification, the verifying program adds the value in each storage location as if it were a binary number, retaining only the number of bits equal to the number of bits in the storage location, usually eight. At the end of the count, the eight-bit value represents the residue or remainder after dividing the sum of all of the storage locations by 256. Therefore, adding all the storage locations except the check character should produce the check character which can be compared to the derived remainder to verify the validity of the code in the added program. Similarly, a modulo-2 counter can be used for each bit in the byte of each storage location and each byte is applied to the modulo-2 counters so that when the check character is reached, the parity bits correspond to the check character. This is equivalent to exclusive-ORing each byte, including the check character, successively into an accumulator. A zero result verifies the code. As noted above, these systems are well known in the art and need not be further explained in greater detail.

Although shown in FIG. 3 as an indeterminate number of characters or bytes at the end of the memory, the CRC or other check characters can be placed at any location within the module. The only limitation is that the character check, as well as the other reference characters, be at a fixed location or at a location defined by a fixed pointer. In one embodiment, the first seven bytes of an add-on module were organized as follows: XX CCCC PPPP QQQQ XX being the high order hexadecimal digits of the address (the low order always being zero), CCCC being four hexadecimal digits (two bytes) comprising a CRC check character, and PPPP and QQQQ being two two-byte pointers for other tables and the like.

In Chart I, a TYPICAL flowchart for a program to practice the invention is shown as an in-line process in that it has a beginning and an end, rather than a call and a return, as terminal nodes. (Appendix B summarizes the conventions of TYPICAL.) The table in the CMOS writable memory constitutes a Boolean array, designated A, the location of which is considered global to the processes to be described herein. The step 2 sets a pointer i to the value of one. Next, at the step 3, the i-th array value is checked. As noted above, this may be a bit or sixteen bits. The check performed by the step 3 determines whether the i-th array entry is zero. If it is not zero, the corresponding module is to be considered to be active, causing the step 4 to be performed which reads the first location in the i-th module. The data read is compared to a reference value. In the embodiment being described, the data and the reference are equal, using the first address word in the particular memory module. If these values are found equal at the step 5, a call (branch-and-link) to the i-th program is performed and the i-th program is executed as indicated at the step 6. The add-on programs are provided with a return so that program control is restored to the instruction following the calling instruction.

The end of the i-th add-on program causes a return to a step 7 which determines whether the last entry in the array table has been checked. If so, the program ends as indicated by the terminal step 10. If not, one is added to the value of the pointer i and the servicing program resumes at the step 3. If the entry in the array indicates at the step 3 that the added program is not active or if at step 5, the data read does not match the reference data, then the final check step 7 is performed, skipping the execution of the i-th module program.

Two verification subroutines are shown below in Algol language for performing the validity checks. The first, VERS, checks the first location of the appropriate module to determine whether the address stored there is equal to the address of the module. If so, a verification bit in another array V is set. If not, V(i) is reset and the subroutine returns to the calling program.

The other, VER, not only checks the first location for the correct reference value but performs a verification check illustrated here as the residue check. That is, the values in the memory locations are added modulo-256 and the sum (residue) checked against the last (check) character of the module. The verification bit, V, is set if they are equal. Otherwise, it is reset.

These verification routines are used in the programs described below.

```
proc. VERS(j,V) integer j; Boolean V;
    V:=if #(j * 2'11 + 3* 2'12)=
    (j * 2'11 + 3 * 2'12)
    then true else false
end VERS
proc. VER(j,V) integer j,k,MODSUM,p; Boolean V;
    k:=j * 2'11 + 3 * 2'12;
    if #(k) ≠ k then begin V:= false; return end
    MODSUM:=0;
    for p:=k step 1 until k + 2'12 −1 do
        MODSUM:=rem( (MODSUM + #(p)), 2' 8);
    V:=if #(p+1) = MODSUM then true else false
end VER
```

An Algol program is shown below for performing the program steps illustrated in Chart 2. The Appendix A attached hereto lists the transliterations from the standard Algol 60 used in the explanation of the invention. In the program, the Boolean array A (CMOS table) is shown outside the procedure to indicate that the array is global to the procedure as is the value of n, an integer. A for statement is performed for values of i running from one through n, inclusively. This for statement performs the steps 2, 7 and 8 in chart 2. The go to value is a conditional statement indicating that if the i-th element of the array A is true (the i-th bit set), then the program transfers to an absolute address, as indicated by the #, calculated by the example expression.

This example expression is illustrative of the calculation to be made for the system of FIG. 1. As seen in FIG. 1, the memory has fixed modules accounting for 12K locations. Therefore, the add-on memory location are 2K steps beginning after 12K (12,288). The 2'11 value (2K) is multiplied by the i value and added to three times 2'12 which points the go to statement to the first address of the i-th module. The 2'11 value provides the 2K boundary increments and 3*2'12 provides the 12K offset necessary because of the first 12K fixed locations.

```
Boolean array A[1:n]
  ...
  proc.      CHKRUN (A,n) integer i; Boolean V;
             for i:=1 step 1 until n do
             if A[i] then begin
             vers(i,V);
             go to if  −V then return else
             #(i * 2'11 + 3 * 2'12)
             end
  end        CHKRUN
```

The flowchart of Chart 2 shows an alternate implementation of the invention in a flowchart of a portion of a larger program. This program is illustrated as part of a RUN program which operates a machine such as a copier in which the add-on programs might be used. The pertinent module begins by setting the pointer i to one by the step 2. The step 3 checks whether the i-th module is valid. This may comprise several tests. In this illustration, the i-th module is considered valid if the first storage location thereof stores a word that is equal to its address plus a verification of the code by one of the means described above, e.g., cyclic redundancy check, block parity check, residue counter, or the like. If the tests prove that the i-th module is valid and verified, then the i-th add-on program is called as shown at the step 6.

The i-th add-on program called by the calling program has in the first part of its coding a routine to check the authorization bit in the CMOS memory. If the program finds that its authorization bit is not set, it returns immediately to the calling program. If the authorization bit is set, the program is run and control returns to the calling program where, at the step 7, a check is made to determine whether this is the last add-on program. If not, the pointer i is incremented at the step 8 and the above-described sequence is repeated.

At the step 3, if the i-th module is found to be invalid, its authorization bit is checked by the step 4. If the authorization bit is not set, the program looks at the next add-on module by the steps 7 and 8. If the i-th module is authorized, then a log error (LOGERR) routine is called as shown at the step 58. This stores an indication that an invalid code existed where a valid code should have been.

After the step 7 determines that all the programs have been tested or run, the program continues with the main program. The following Algol program shows the details for a program to execute the steps shown in Chart 2.

As in the previous program, the Boolean array A is global to the program. Again, the for statement accomplishes the handling of the pointer as shown in the steps 2, 7 and 8. The Verify subroutine as explained above is called to set the value of the Boolean variable V.

```
Boolean array A[1:n] ...
  ...
  proc.      VRUN (A,n) integer i; Boolean V;
             for i:=1 step 1 until n do
             begin ver(i,V);
             go to if V then #(i * 2'11 + 3 * 2'12)
             else
             if A[i] then logerr(i) end
  end        VRUN
```

The called program, shown below as ADDON-PROGi, has as one of its first statements, the test of its authorization bit which, if not set, causes a return to the calling program.

```
Boolean array A[1;n]
  ...
  proc ADDONPROGi ...
     if −A[i] then return
  ...
```

The LOGERR(i) subroutine is now shown in detail. It is only ancillary to the program and, in effect, merely stores the value i at a particular location to record the fact that the i-th program module was faulty. Such a subroutine is within the ordinary skill of the art.

In Chart 3, an alternate routine for running add-on programs is shown as part of a preliminary routine, such as a Power On Reset program which is performed when the machine is first turned on, tests each module and, if valid, sets an ENABLED bit in a table E in the writable memory such as the Read/Write memory to conserve the space in the CMOS memory. The steps are similar to the routine of Chart 2. The step 8, however, instead of calling the i-th program, sets the enabling bit in the enabling array, E. Later, at the appropriate place in the program, the J-th enabling bit is tested to determine whether to perform the program in the j-th module. If the enabling bit is set, then the j-th module is called as shown in the step 66.

Part of the program can also reset an enabling bit such as shown in step 13 if machine conditions indicate that the k-th program may control a feature which is later found to be nonoperational. Although the POR enabled the program it may be disabled in light of subsequent events as shown in Chart 3.

The program is shown below in more detail in a suitable Algol program. The enabling array E is also considered to be global to the program. The steps 12 and 13 are also shown for executing the add-on program at some arbitrary location in the main program. The step 13 is also shown as resetting the enabling bit of the k-th program. It should be noted that if the k-th program were not enabled, this step would have no effect, but if it were enabled, this step will disable it. A subsequent step, of course, ought not be used to enable the program. The enabling bit is set only if the program is verified. As in the previous program, the called program checks its authorization bit. Alternatively, the authorization bit could be checked before setting the enabling bit. Such modifications would be apparent to a person of ordinary skill in the art given the teachings of this application.

---

Boolean array A[l:n], E[l:n], ...
...
proc.    SPROG (A,E) integer i; Boolean V;
         for i:=1 step 1 until n do
         begin ver(i,V); E[i]:=V end
end      SPROG go to if E[j] then #((j − 1) * 2'11 + 3 * 2'12)
...
E[k]:= if (cond) then false
...

---

In the above description, an error was logged if a malfunction in the program code was detected. It is desirable, especially in multi-user environment, to allow the machine to continue to operate if the associated feature is not essential to the main copier functions. If the feature is essential to the operation of the copier machine, such as a security feature that prevents unauthorized use of the copier, then a feature malfunction should inhibit further operation of the machine until the problem has been repaired. This is true also if the feature interacts with the main control program to control some important function of the machine.

Since the basic control program may be written before a feature is conceived, the main program is not planned for the special feature. It is not cost-effective to change the main control program for each feature added after the main program has been completely debugged. The main program must, however, be able to determine whether the added program is correct or not executable for some reason. If not, then the main program must be able to determine whether the inoperable feature is an essential one.

To determine whether the feature that has been found unexecutable is essential to the continued operation of the machine, the add-on code contains a flag (bit or byte), shown in FIG. 3 as a byte F 33 which is located in the add-on memory module at the location following the first address. Instead of logging an error as shown and described above, the program checks whether the F flag is set. If set, the machine is run without the feature. If not set, the machine operation is inhibited. In the above-illustrated programs, the error logging is replaced by a call to a subroutine that checks the feature flag F and stops the machine if the feature is essential, i.e., if the flag is reset.

The flag can, of course, be considered to be essential if the flag is set but the feature would thereby be considered to be nonessential if the flag were reset. If the memory module is faulty and is not being read from correctly, the absence of a bit is most likely to be read as a reset flag. Therefore, the default condition would be considered to be the nonessential condition, which is undesirable since the assumption should be made that the inoperable feature is essential unless otherwise indicated. This prevents the attempted operation of the machine when a feature is inoperable because of a nonreadable memory, the assumption being that the feature is essential when there is no indication to the contrary.

A sample program for the above-described subroutine will now be described. Again, the array F is considered global to the subroutine.

---

Boolean array F[l;n]
...
proc     CHKFTRE
         if F[i] then return
         stop
end

---

Figure 4:
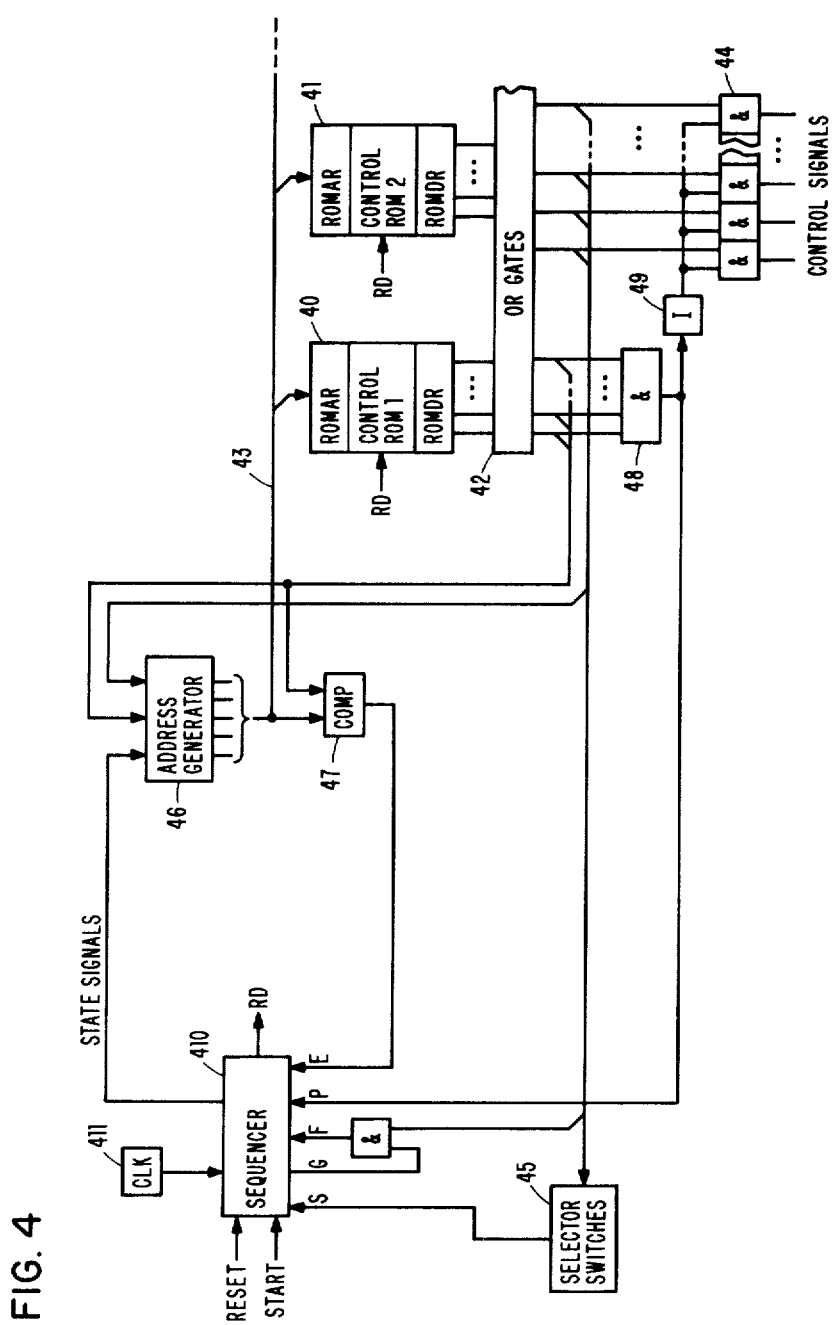
FIG. 4 is a block diagram of a system suitable for practicing the invention.

A control system in which the invention may be used is shown in FIG. 4. The control signals for the controlled machine are stored in several read-only memory modules 40 and 41. The output signals from the modules are coupled to each of the modules. The modules, address bus, and an OR gate network are arranged so that additional modules can be added to the illustrated system.

The output signals from the modules are grouped into two sets of signals—the control signals and the next address signals. The control signals are transmitted to the controlled machine through an AND gate network 44 and are also applied to a selector switch network 45 and an address generator 46.

The next address signals are also applied to the address generator 46 as well as to a comparator 47 and an AND gate 48. The AND gate 48 supplies an output signal when the next address is all ones. This signal is inverted by an inverter 49 which inhibits the AND gate network 44, preventing the control signals from being transmitted to the machine being controlled. The output signal from the AND gate 48 is also applied to a sequencer 410 as a P-signal.

The output signal from the comparator 47 is applied as an E-signal to the sequencer 410. Other input signals to the sequence 410 include a clock signal from a clock source 411, an S-signal from the selector switch network 45 and an F-signal from the least significant bit of the control signal group. The F-signal is gated into the sequencer 410 by a G-signal generated within the sequencer as will be explained in detail below. A RESET and a START signal are also supplied to the sequencer.

The operation of the system illustrated in FIG. 4 is summarized as follows in connection with the state diagram of FIG. 6 which shows the various states of the sequencer 410. When the START signal is received by the sequencer 410, a signal is supplied to the address generator 46 to cause an address of all zeroes, i.e. 0000 (base 16), to be applied to the address bus 43. A RD (read) signal from the sequencer 410 causes the addressed first module 40, in which the main operating program is stored, to access the first location. The contents of the addressed location are placed in the data register (ROMDR), pass through the OR gate network 42, and are routed according to their group. The control signals are applied to the controlled machine through the AND gate network 44 and the next address signals are applied to the address generator 46. At the next clock pulse, the address generator produces an output signal onto the address bus 43 determined by the next address. The contents of the addressed module are accessed and gated as previously described. The main program is assumed to be in the first module 40.

At certain breakpoints in the main program, a check is made whether there are add-on modules with programs to be executed. A breakpoint is indicated by a next address of all ones. This is detected by the AND gate 48 which produces the P-signal to the sequencer 410 and, via the inverter 49, inhibits the gating of the control signals to the machine being controlled. The control signals at the breakpoint identify the feature program to be run at the particular breakpoint.

The control signals at a breakpoint are compared in the selector switch network 45 with the setting of an associated switch which indicates that the particular subroutine is installed. An appropriate S-signal is supplied to the sequencer 410 to indicate whether the desired subroutine is present. If not present, the sequencer 410 produces a suitable signal to the address generator 46 to continue running the main program.

If the S-signal indicates that the selected subroutine is present, then the sequencer 410 supplies signals to the address generator 46 to cause the following sequence of events. The first address of the module containing the selected subroutine, the address being the value on the control signal lines, is gated onto the address bus 43 and is also applied to the comparator 47. The next address of the accessed location is also applied to the comparator 47 which supplies the E-signal to the sequencer 410 if the address and retrieved next address are equal.

If the comparator 47 produces an output signal indicating equality, the address is incremented by two and the subroutine is executed. The subroutine has a return instruction that causes a return to the main program when the subroutine is completed.

If the address and the retrieved next address are not equal, then the address is incremented by one and the F-flag at the address following the address byte is checked. If the F-flag is set, the address is incremented by one and the main program resumes, usually after producing some type of display to the operator that the selected feature is not operable. If the F-flag is not set, then the machine is put into a HALT state by the sequencer 410.

Figure 5:
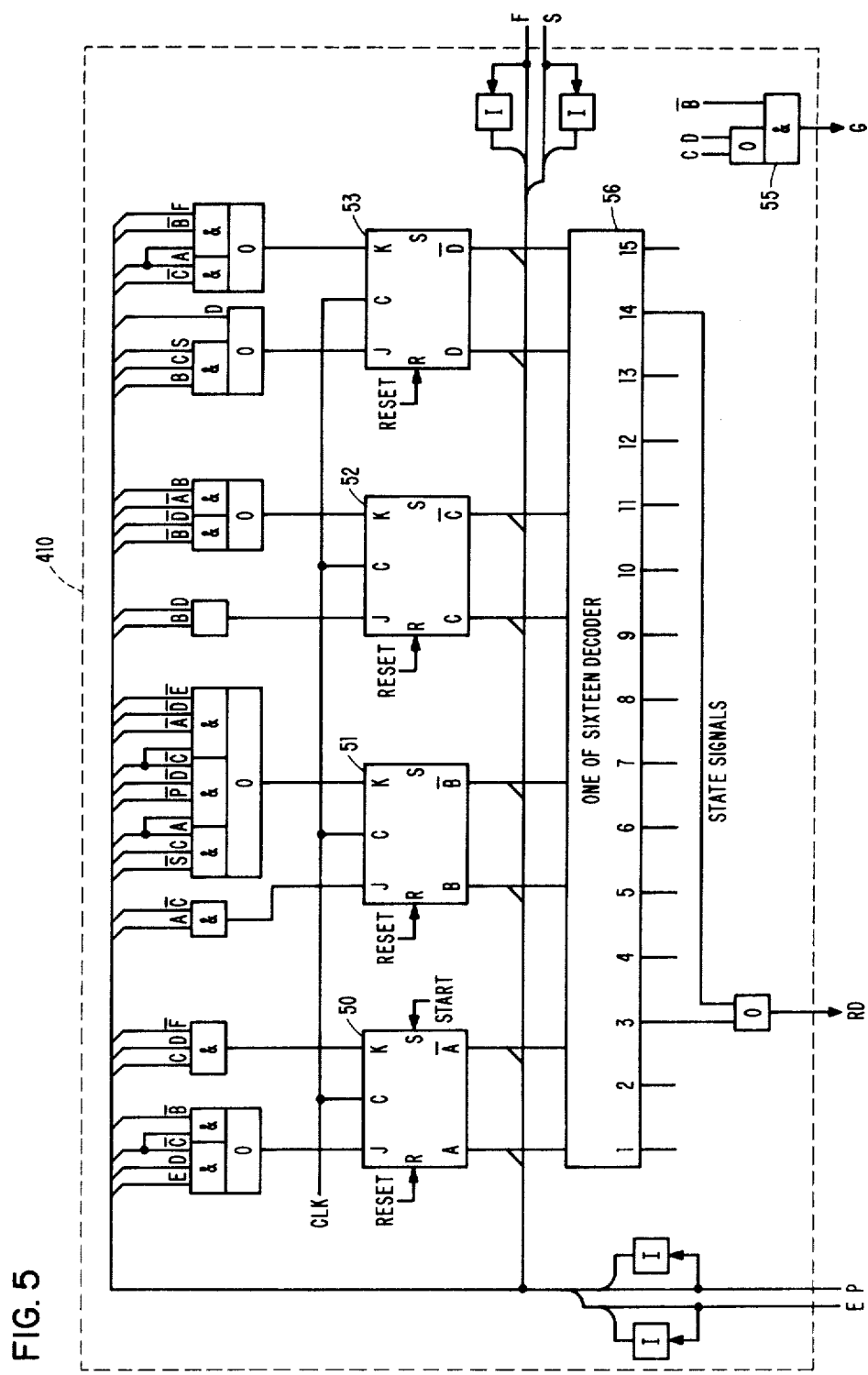
FIG. 5 is a block diagram of a logic circuit suitable for use as a sequencer in the system of FIG. 4.
Figure 6:
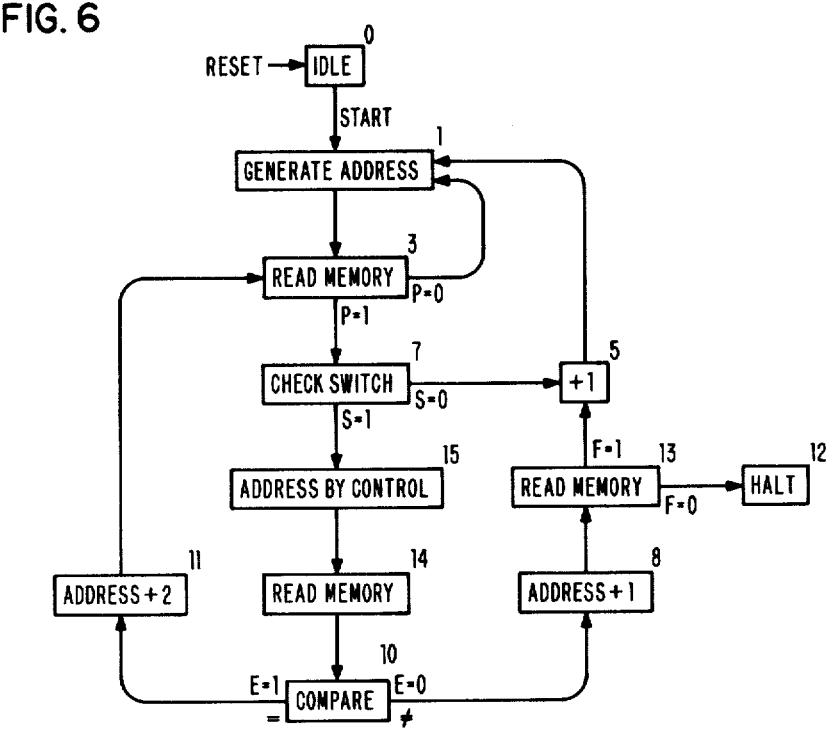
FIG. 6 is a state diagram illustrating the sequencing of states in the system of FIG. 4.

The state numbers of the various steps are shown in FIG. 6 adjacent the individual steps. A suitable sequencer for use in the system of FIG. 4 is shown in FIG. 5. Four triggered J-K flip-flops 50-53 are used to determine the present state. The E-, P-, F-, and S-signals and their inverted values are used with the output signals from the flip-flops 50-53 to determine the next state at each clock pulse (CLK). The RESET signal resets all the flip-flops and the START signal sets the least-significant flip-flop 50 to take the sequencer 410 to the 1-state (0001).

The output signals from the flip-flops are also applied to a decoder 56 which produces a unique output signal for each of the states as determined by the flip-flops 50-53. These are the controlling signals for the address generator as will be seen in the description of the latter which follows in more detail. The G-signal is generated by the logic gate arrangement 55. The RD signal is the ORed function of the states 3 and 14.

Figure 7:
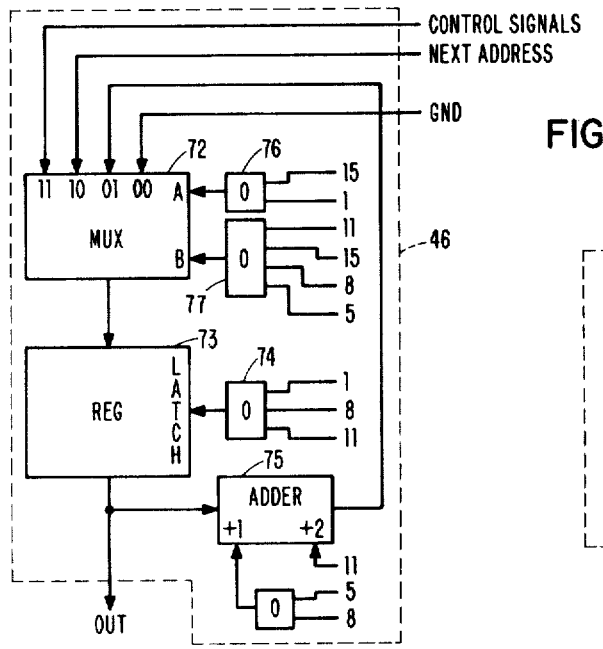
FIG. 7 is a logic diagram of a circuit suitable for use as an address generator in the system of FIG. 4.

A suitable circuit for the address generator 46 is shown in FIG. 7. A multiplexor 72 receives as input signals the control signals and next address signals from the memory modules and also an adder output and ground (logical zero) signals. A pair of input control bits, A and B, select the input signals to be gated to the output of the multiplexor 72 which is coupled to a register 73. The input signals to the register 73 are stored in the register by a latch signal which is supplied by an OR gate 74. The register output signals are coupled to the address bus and also to the input of an ADDER circuit 75 which adds a value of one or two to the register value and the sum is coupled to one of the inputs of the multiplexor 72.

The input signals A and B are supplied by two OR gates 76 and 77, respectively. When both OR gates are active, the control signal input signals are gated to the multiplexor's output and to the input terminals of the register 73.

The input signals to the OR gates and the +2 input of the adder 75 are the state signals from the sequencer 410. The A and B control input signals to the multiplexor 72 are both zero for state zero so the output signals from the multiplexor are zero, the first address for starting the operation of the machine. For state one, the output from the multiplexor 72 is the next address signal group which controls the sequence in which the programmed control steps are retrieved from the memory modules. The operation of the address generator 46 is clear from an analysis of the state flowchart shown in FIG. 6.

Figure 8:
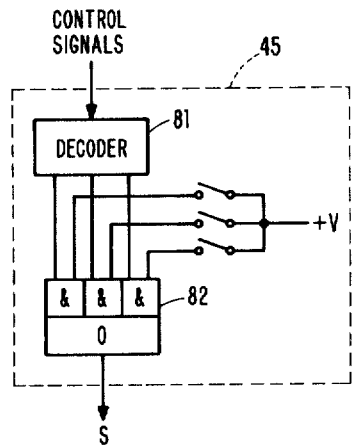
FIG. 8 is a logic diagram of a circuit suitable for use as a switching network in the system of FIG. 4.

A suitable switch selector network 45 is illustrated in FIG. 8. The control signals are decoded by a decoder 81 into a unique logic signal which is applied to one of a plurality of AND gates in an AND-OR network 82. (Only three are shown for illustrative purposes). A switch corresponding to the feature represented by the decoded control signals is coupled to the corresponding AND gate of the network 82 so that if the switch is closed, the S-signal will be supplied at the OR gate output from the network 82. Therefore, if the switch corresponding to a desired subroutine, as identified by the control signals, is closed to indicate the program memory module is installed and the decoded control signal indicates that the desired subroutine is to be called, the S-signal will be generated as explained above.

Both a programmed processor and a programmed controller version of systems for practicing the invention have been illustrated and described in detail. The systems permit a programmed controller to execute add-on programs and incorporate the capability of determining whether the controlled machine can continue to operate if one of the add-on control programs is faulty or nonoperable.

Various modifications to the systems and circuits described and illustrated to explain the concepts and modes of practicing the invention can be made by those of ordinary skill in the art within the principles or scope of the invention as expressed in the attached claims.

| CHART 1: CHKRUN Program Module |
|---|
| 1. begin |
| 2. i=1 |
| 3. A(i):=:0 ? (7)   ¢ is i-th module active? ¢ |
| 4. read first location of i-th module as DATA |
| 5. DATA :=: REFERENCE ? (7)' |
| 6. call module i   ¢ module i called at abs. address i*2'11 + 3*2'12 ¢ |
| 7. i :=: imax ? (10) |
| 8. (+1)i |
| 9. (3) |

CHART 1: CHKRUN Program Module -continued 10.  end

CHART 2: ALTCHKRUN Program Module 1.  begin
2.  i=1
3.  A(i) :=:1 ? (6)        ¢ i-th module valid? ¢
4.  V(i) :=:1 ? (7)'       ¢ i-th module authorized? ¢
5.  log error              ¢ subroutine is called to log the error ¢
6.  call module-i
7.  i :=: imax ? (10)
8.  (+1)i
9.  (3)
10. end

CHART 3: SPROG Program Routine 1.  begin
2.  A(i) :=:1 ? (8)        ¢ i-th module valid? ¢
3.  V(i) :=:1 (5)'         ¢ i-th module authorized? ¢
4.  logerr                 ¢ log error
5.  i :=: imax ? (10)
6.  (+1)i
7.  (2)
8.  E(i)=1
9.  (5)
10. continue               ¢ main program is executed ¢
11. E(j) :=:0 ? (13)
12. call j-th module       ¢ j-th add-on program executed ¢
13. E(k)=0
14. end

APPENDIX A

Algol 60 has been used to illustrate the best mode of practicing the invention. Compilers vary from machine to machine so transliterations are allowed within the symbol set of the language. There are also translators that use the source code for one compiler to generate source code for another compiler. An Algol to Fortran translator, for example, will take the following Algol for statement for $v_1 := e_1$ step $v_2$ until $e_2$ do S where $v_1$, $v_2$ = variables,
$e_1$, $e_2$ = expressions, and
S = statement (including compound statement),
and generate a Fortran DO loop as follows:
DO 100 $v_1 = e_1$ TO $e_2$ BY $v_2$
S
100 CONTINUE.

The Algol programs included herein use lower case underlined words for the reserved words. The transliterations used include:

| DEFINITION | SYMBOL | TRANSLITERATION |
|---|---|---|
| assignment operator | ← | := |
| exponentiation | ↑ | ' |
| multiplication | × | * |
| subroutine declare | procedure | proc. |
| 'not' operator | — | ' |

The special compiler instruction, #, indicates that an absolute address is to be compiled equal to the expression following the instruction #. For example, #(i * 2'11 + 3 * 2'12) with i=3 will generate an absolute address equal to 18,432. The compiler, of course, will generate this value as called for by the object machine. If the object machine uses hexadecimal addressing, the above value will be compiled as address 4800.
Each compiler is furnished with its own library of functions such as sqrt (square root), sin (sine), acrtan (arctangent), and so on,

APPENDIX A-continued which are standard, plus special functions. The following special library functions are assumed to be provided by the compiler:

rem (x,y) : integer routine: supplies the remainder of the division of x by y
gcd (x,y) : integer routine: supplies greatest common divisor of x and y

APPENDIX B

SUMMARY OF TYPICAL

Each step
1.  comprises one or more lines,
2.  is consecutively numbered,
3.  may comprise more than one statement, each separated by semicolons,
4.  may be labelled with a label extending at least two spaces to the left of the statements, followed by a semicolon, and
5.  can be merely a branch (unconditional).

The relational operators are:

| | |
|---|---|
| less than | :lt: |
| less than or equal to | :le: |
| greater than | :gt: |
| greater than or equal to | :ge: |
| equal to | :=: |
| not equal to | :#: |
| equivalence | :eqv: |
| implication | :imp: |

Special symbols:

( ) signifies, when enclosing a step number or label, a branch to the step; modification expression to be applied to a following variable or register without changing the position of the variable or register; signifies, when enclosing a register name or mnemonic, the contents of the register if confusion would otherwise result.

(( )) signifies the address of the enclosed variable.

X indicates that a following literal string is represented in hexadecimal.

; separates statements; separates indices of different dimensions.

: indicates a comparative test; separates a label from a following statement; sets off relational operators.

? follows and identifies a test statement.

" encloses a string of literals.

Upper case letters are used for variable mnmeonics and key words of special statements.
Lower case underlined letters are used for reserved words having a predetermined function.

Test Statements:

A test statement (decision block) can be either of two types, logical or comparative. A test statement is identified by a following question mark and parentheses enclosing the step to which a branch is to be taken depending on the test results.

A logical test is expressed using logical expressions and logical and relational operators. The logical expressions may contain any type operator and variable. The question mark after the test is followed by a step number or label in parentheses indicating the step to which a branch is taken if the test result is true. If the parentheses are followed by a NOT operator ('), the step indicated is branched to if the test result is false.

A comparative test is indicated by a colon separating left-hand and right-hand expressions. The question mark after the test is followed by three step numbers or labels separated by commas and enclosed in parentheses. The expressions are evaluated and their values compared. The first step is branched to if the left-hand value is less than the right-hand value. The second step is branched to if the left- and right-hand values are equal. The third step is branched to if the left-hand value is greater than the right-hand value. A minus sign in place of a step number or label indicates the following step.

Special Statements:

Three special statements are provided for handling conditional decisions and for looping through sequences of statements under given conditions. These special statements are actually ways of writing commonly used sequences of statements that occur frequently in most programs. The key words of the special statements are written in upper case letters.
In the following explanations, s1, s2, . . ., sn, sm represent statements or sequences of statements.
The conditional statements are the IF-THEN statements and the

APPENDIX B-continued
SUMMARY OF TYPICAL

CASE statements.

IF-THEN Statements:

The form of the statement is
IF (conditional statement) THEN s1 ELSE s2 FIN
The statements s1 are executed if the conditional statement is true
and the statements s2 are executed if the conditional statement
is false
The ELSE s2 is optional, and if omitted, a false conditional
statement will cause the statements s1 to be skipped and the
program to continue with the steps following FIN.
FIN is used to terminate the IF-THEN statement because s1 or
s2 can constitute an arbitrary number of statements.

CASE Statements:

The form of the statement is
CASE (expression)
:(value 1): s1,
:(value 2): s2,
...
:(value n): sn,
:ELSE: sm.
The expression is evaluated and the statements associated with
the value of the expression are executed, the other statements
being skipped.
The ELSE is optional. If the value of the expression is not
covered by the CASE statement values and the ELSE is omitted,
program execution continues with the statements after the CASE
statement which is terminated by a period. A comma identifies
the end of the statements associated with a given value.
The CASE statement eliminates the sequence of several IF-THEN
statements that would otherwise have to be written to execute
a given series of statements associated with a particular
value of the expression.
The looping on condition statement is the WHILE-LOOP statement.

WHILE-LOOP Statements:

The form of the statement is
WHILE (conditional statement) s1 LOOP
The conditional statement is tested and if true, the
statements s1, terminated by the key word LOOP, are executed
and the process repeated. If the conditional statement is false,
then the statements s1 are skipped and program execution continues
with the steps following LOOP.
The key words of the special statements should be written on
separate lines if the entire statement is too long for one line.
Two key words should not otherwise be written on the same line.
If a key word is not followed by an executable statement, the
line is not numbered.
Indentations may be used to improve the readability of the
program but many indentations become a problem, especially when
labels are used. The reading of the program can be aided by
writing after the terminal key words FIN or LOOP, the step
number of the related key word.

Definitions and Reserved Words:

The words enter and return are the delimiters for subroutines
invoked by call. The return statement in the subroutine causes
a branch to the calling routine to the step following the invoking
call. There may be more than one return statement in a subroutine.
The call indicates a branch, with required linking of parameters,
to the named subroutine. If requied for clarity, the subroutine
input parameters are listed after the name of the subroutine
separated by commas and terminated with a semicolon. The output
parameters being returned to the calling program folllow the semi-
colon and are separated by commas if more than one. The
parameters are enclosed in parentheses.

What is claimed is:

1. In a method for adding programming code to an existing main program for controlling a machine where the add-on code is stored in a second memory module separate from a first memory module in which the main program is stored and the first addressable location of the second memory module stores a test word equal to a reference word, the improvement comprising the steps of:

storing a flag in a referenced location of the second memory module, said flag having one value if the add-on program is essential to the continued operation of the machine and having another value if said machine can be operated without said add-on program;

testing said second memory module to determine whether said second module is operable;

executing the add-on program if said testing step determines the add-on program to be operable, otherwise checking the flag to determine whether said add-on program is essential;

inhibiting the operation of the machine if said add-on program is determined to be essential; and continuing execution of the main program if said add-on program is determined not to be essential.

2. The invention as claimed in claim 1 wherein the testing step includes the steps of:

reading the data from the first addressable location of the second memory module;

comparing the read data to the reference word; and determining the second memory module to be operable if said comparing step produces an equality.

3. The invention as claimed in claim 2 wherein the reference word is the address of the first addressable location of the second memory module.

4. A system for controlling a machine, said system comprising, in combination:

main memory means for storing control words;

means for selectively accessing said control words;

means for supplying to the controlled machine control signals derived from said accessed control words;

add-on memory means coupled to said accessing means for storing additional control words;

means responsive to said control words accessed by said accessing means for checking the validity of said additional control words;

means responsive to said checking means for determining whether said additional control words are essential to the operation of the controlled machine; and means responsive to said determining means for causing said accessing means to bypass invalid additional control words when said invalid additional control words are not essential to the operation of said controlled machine.

5. The invention as claimed in claim 4 wherein said determining means includes:

flag means stored with said additional control words for indicating whether said additional control words are essential to the operation of said controlled machine, and means included in said determining means for sensing said flag means.

* * * * *